(12) United States Patent
Balk

(10) Patent No.: US 8,827,203 B2
(45) Date of Patent: Sep. 9, 2014

(54) CONNECTING A PROPULSION SYSTEM TO A STRUCTURAL ELEMENT OF AN AIRCRAFT

(75) Inventor: Wouter Balk, Melun (FR)

(73) Assignee: Snecma, Paris (FR)

( * ) Notice: Subject to any disclaimer, the term of this patent is extended or adjusted under 35 U.S.C. 154(b) by 1128 days.

(21) Appl. No.: 12/349,697

(22) Filed: Jan. 7, 2009

(65) Prior Publication Data

US 2009/0184198 A1 Jul. 23, 2009

(30) Foreign Application Priority Data

Jan. 23, 2008 (FR) ...................................... 08 00336

(51) Int. Cl.
B64D 27/00 (2006.01)
(52) U.S. Cl.
USPC .......................................................... 244/54
(58) Field of Classification Search
USPC ............... 244/53 R, 54, 129.1; 248/554–557; 60/796
See application file for complete search history.

(56) References Cited

U.S. PATENT DOCUMENTS

| | | | | | |
|---|---|---|---|---|---|
| 3,533,237 | A | * | 10/1970 | Rabone et al. ................ | 60/226.1 |
| 4,318,516 | A | * | 3/1982 | Cole ................................ | 244/54 |
| 5,275,357 | A | * | 1/1994 | Seelen et al. .................... | 244/54 |
| 5,524,847 | A | * | 6/1996 | Brodell et al. .................. | 244/54 |
| 5,727,755 | A | * | 3/1998 | Craig ........................... | 244/53 R |
| 5,873,547 | A | * | 2/1999 | Dunstan .......................... | 244/54 |
| 6,546,734 | B2 | * | 4/2003 | Antoine et al. ................. | 60/772 |
| 6,758,438 | B2 | * | 7/2004 | Brefort et al. .................... | 244/54 |
| 8,141,817 | B2 | * | 3/2012 | Baillard et al. ............. | 244/53 R |
| 8,167,237 | B2 | * | 5/2012 | Suciu et al. ...................... | 244/54 |
| 2005/0067528 | A1 | * | 3/2005 | Loewenstein et al. .......... | 244/54 |
| 2005/0269444 | A1 | * | 12/2005 | Marche ........................... | 244/54 |
| 2006/0219841 | A1 | * | 10/2006 | Dron et al. ....................... | 244/54 |
| 2007/0120010 | A1 | * | 5/2007 | Huggins et al. ................. | 244/54 |
| 2007/0138337 | A1 | * | 6/2007 | Audart-Noel et al. ...... | 244/53 R |
| 2008/0135679 | A1 | * | 6/2008 | Udall .............................. | 244/54 |

FOREIGN PATENT DOCUMENTS

| | | | |
|---|---|---|---|
| EP | 1 627 812 | A2 | 2/2006 |
| GB | 2 010 969 | A | 7/1979 |
| GB | 2 064 005 | A | 6/1981 |
| GB | 1 599 730 | | 10/1981 |
| GB | 2 200 878 | A | 8/1988 |
| GB | 2 203 105 | A | 10/1988 |
| WO | WO 92/08642 | | 5/1992 |

OTHER PUBLICATIONS

U.S. Appl. No. 13/001,172, filed Dec. 23, 2010, Balk, et al.

* cited by examiner

*Primary Examiner* — Valentina Xavier
(74) *Attorney, Agent, or Firm* — Oblon, Spivak, McClelland, Maier & Neustadt, L.L.P.

(57) ABSTRACT

An aircraft propulsion system (110) comprising a bypass turbojet engine surrounded by a nacelle defining a flow passage for the secondary stream flows, and connection means for connecting the engine to a wing (132) of an aircraft and comprising a pylon (134) substantially parallel to the longitudinal axis (135) of the engine together with suspension means suspending the engine from the pylon, the pylon being angularly offset from a vertical plane (150) containing the longitudinal axis of the engine and from the top of the nacelle, and being situated outside the flow path for the secondary stream.

15 Claims, 4 Drawing Sheets

CONNECTING A PROPULSION SYSTEM TO A STRUCTURAL ELEMENT OF AN AIRCRAFT

The present invention relates to a propulsion system for an aircraft, the propulsion system comprising a bypass turbojet engine mounted inside a nacelle defining a flow path for the secondary (bypass) stream of air, together with connection means for connecting the engine to a structural element of the aircraft, such as a wing of the aircraft.

The propulsion system is connected to the wing of the aircraft by means that transfer to the wing the forces generated by the engine in its various stages of operation.

The connection means for connecting the propulsion system generally comprise a part that is very robust and very heavy, known as a pylon, and that is arranged between the turbojet engine and the wing of the aircraft. The pylon extends substantially in a vertical plane that contains the longitudinal axis of the engine, and it includes engine suspension means that pass all of the forces that are transferred between the engine and the aircraft.

In order to reduce the sound nuisance and fuel consumption of turbojet engines, manufacturers are tending to increase the bypass ratio of such engines, i.e. to increase the ratio of the flow rate of the secondary stream to the flow rate of the primary stream. For this purpose, one solution consists in increasing the diameter of the fan and of the nacelle, while reducing the transverse dimensions of the body of the turbojet.

Nevertheless, increasing the diameter of the fan and of the nacelle leads to an increase in the transverse size of the propulsion system. In order to ensure that the aircraft retains sufficient ground clearance, the propulsion system needs to be moved closer to the wing of the aircraft, thereby reducing the space available for the pylon, which pylon is situated between the propulsion system and the wing. The space occupied by the pylon is relatively large since it needs to have a structure that is sufficiently rigid and strong. Typically, the pylon is made of titanium and is relatively heavy. It is generally located downstream from the turbojet fan and it extends at least in part in the flow passage for the secondary stream, thereby disturbing the flow of said stream. The portion of the pylon that passes through the passage for the secondary stream needs to be faired so as to have a streamlined profile and so as to limit the amount of interfering turbulence and drag downstream from the pylon.

A particular object of the present invention is to provide a solution to these problems that is simple, effective, and inexpensive.

To this end, the invention provides an aircraft propulsion system comprising a bypass turbojet engine surrounded by a nacelle defining a passage in which the secondary stream flows, and connection means for connecting the engine under a structural element of an aircraft, in particular under a wing of the aircraft, the connection means comprising a pylon situated radially outside the flow passage for the secondary stream and lying in a plane substantially parallel to the longitudinal axis of the engine, and means for suspending the engine from the pylon, the plane of the pylon being angularly offset from a vertical plane containing the longitudinal axis of the engine, the system being characterized in that the means for suspending the engine from the pylon comprise two parallel and substantially horizontal transverse beams that connect the pylon to hinge means on top portions of the casings of the engine.

In the invention, the connection means for the engine comprise a single pylon that is offset to one side of the engine so as to disengage the space situated between the propulsion system and the wing of the aircraft. By way of example, the pylon is offset about the longitudinal axis of the engine through an angle lying in the range 30° to 60°, and for example equal to about 45°, this angle being measured in a plane perpendicular to the longitudinal axis of the engine.

The lateral space in which the pylon is situated is of volume that is larger than the volume situated between the propulsion system and the structural element of the aircraft, thereby making it easier to install and remove the pylon in said lateral space. The fact that the pylon is offset to one side of the engine also serves to limit turbulence in the flow of air between the propulsion system and the wing. The propulsion system may be moved closer to the wing of the aircraft in order to have good ground clearance. The pylon is situated outside the secondary stream and therefore does not disturb the flow of said stream, thereby improving the performance of the turbojet. The pylon is also spaced apart from hot structures of the turbojet and as a result, in operation, it is exposed to temperatures that are lower than in the prior art. It is then possible to envisage making the pylon out of a material that is light in weight but robust, such as a composite material. Another argument in favor of this configuration is associated with the fact that for an aircraft flying at speeds close to the speed of sound, the sweep of the wings has the effect that the pylon becomes shorter because it is offset inwards, thereby enabling its weight to be reduced. Finally, the reduction in interfering drag downstream from the pylon serves to limit the sound nuisance generated by the propulsion system.

According to a characteristic of the invention, the means for suspending the engine comprise two parallel and substantially horizontal transverse beams connecting the pylon to hinge means on top portions of the engine casings.

The engine suspension beams extend from the pylon situated on the side of the engine substantially as far as the longitudinal vertical plane. The ends of the beams are connected by link-and-hinge means to top portions of the engine casings. These link-and-hinge means, together with the center of gravity of the propulsion system, preferably lie in the vicinity of the longitudinal vertical plane, thereby limiting any risk of the engine tilting during a maintenance or inspection operation in which the engine is removed and/or put into place.

The pylon may carry an upstream transverse beam that is connected by hinge means to a top portion of the intermediate casing of the engine, and a downstream transverse beam that is connected by hinge means to a top portion of an exhaust casing of the engine.

By way of example, the means hinging the upstream transverse beam to the top portion of the intermediate casing comprise three links, a first link connected to the free end of the beam, a second link connected to an intermediate portion of the beam, and a third link connected to the beam between its intermediate portion and the pylon. The links are advantageously hinged to the upstream beam and to the intermediate casing via ball-and-socket connections.

The link-and-hinge means connecting the upstream beam to the intermediate casing are advantageously designed to take up forces acting in lateral and vertical directions relative to the axis of the engine, and also to take up the torque acting about the axis of the engine.

By way of example, the downstream transverse beam is connected at its free end to two links in a V-shaped configuration, the links being hinged to the exhaust casing. These links pass through the flow passage for the secondary stream and they are faired at least in part in order to limit turbulence and head losses in the stream. These links may be hinged to the downstream beam and to the exhaust casing via ball-and-socket connections.

The link-and-hinge means between the downstream beam and the exhaust casing are advantageously designed to take up forces acting in the lateral and vertical directions relative to the axis of the engine.

The pylon may also include an oblique rigid arm supporting means for taking up thrust from the engine, the arm extending from the pylon towards the engine and being connected at its free end to a crossbar whose own ends are connected to the intermediate casing via links.

By way of example, the connection points between these two links and the intermediate casing are spaced apart from each other about the longitudinal axis of the engine, by an angle lying in the range 90° to 180°, approximately, this angle being measured in a plane perpendicular to the longitudinal axis of the engine. These connection points are preferably symmetrical to each other about an oblique plane containing the longitudinal axis of the engine and the pylon. The support arm may extend substantially radially in this plane.

Advantageously, the support arm forms a portion of a streamlined duct for passing services such as fluid-conveying pipes and electric cables. It extends through the flow passage for the secondary stream and may present a streamlined profile, at least in part.

The invention can be better understood and other characteristics and advantages of the invention appear on reading the following description made by way of non-limiting example and with reference to the accompanying drawings, in which.

Figure 1:
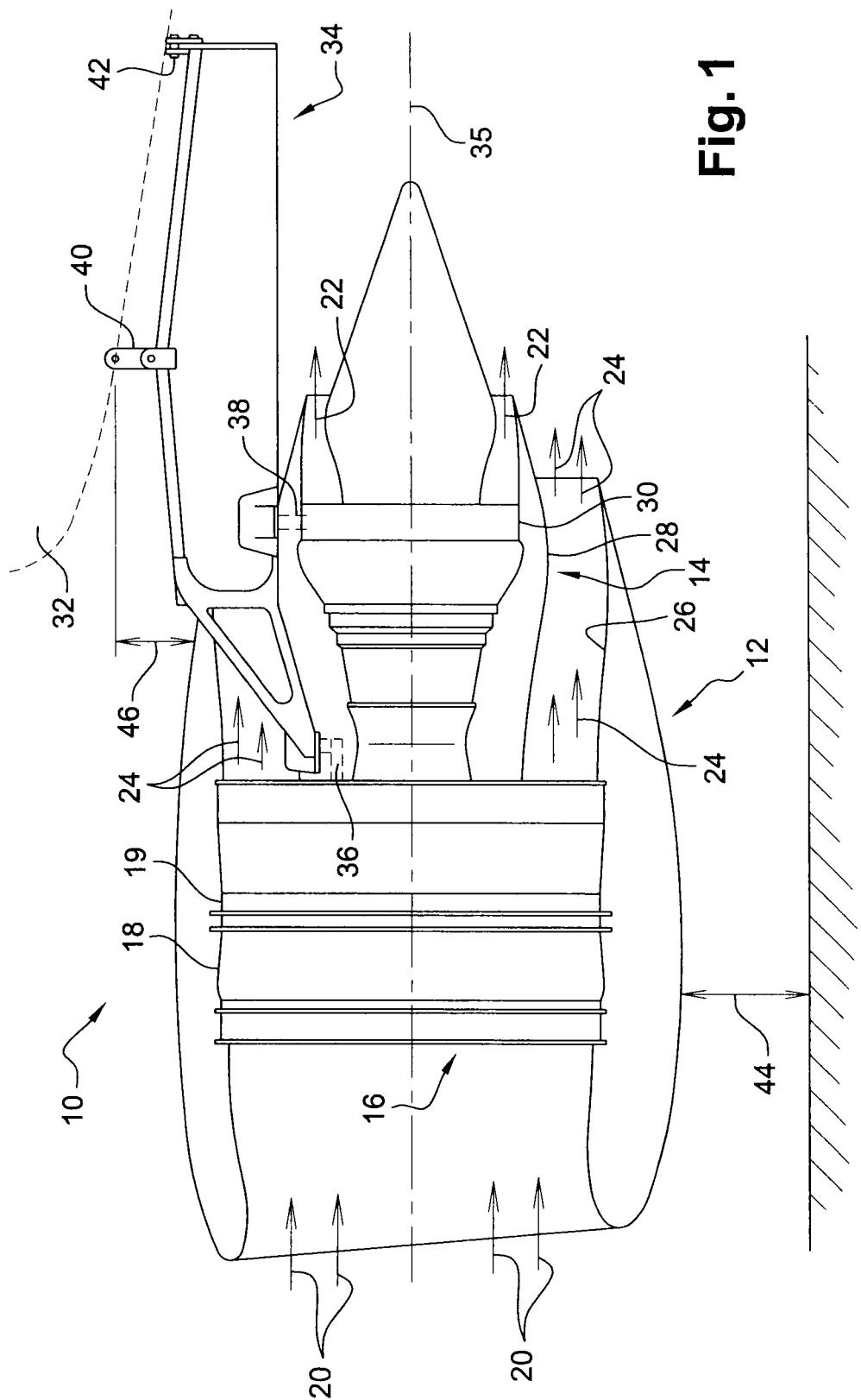
FIG. 1 is a diagrammatic side view of a prior art aircraft propulsion system.

The aircraft propulsion system 10 shown diagrammatically in FIG. 1 comprises a nacelle 12 of generally cylindrical shape, having mounted therein a bypass turbojet 14 having a front fan 16 the wheel of which being driven in rotation inside a fan casing 18. The fan casing 18 is connected at its downstream end to a circularly-cylindrical outer wall of an intermediate casing 19. The casings 18 and 19 carry the nacelle 12.

Downstream from the fan, the air stream 20 sucked in by the fan 16 is split firstly into a primary stream 22 that passes through the turbojet 14, itself comprising, going from upstream to downstream: a compressor, a combustion chamber, and a turbine, and secondly a secondary stream 24 that flows between the body of the turbojet 14 and the nacelle 12 and that delivers the majority of the thrust, in addition to the thrust that is delivered by the combustion gas ejected from the turbine.

The passage for the secondary stream 24 is defined on the outside by the inner wall 26 of the nacelle 12, and on the inside by a cylindrical shell 28 surrounding the turbojet body and extending from the hub (not shown) of the intermediate casing 19 to an exhaust casing 30 situated at the outlet from the turbine.

In present practice, the propulsion system 10 is generally connected under a wing 32 by means of a pylon 34 that extends substantially in a vertical plane containing the longitudinal axis 35 of the turbojet, occupying the space 46 that is situated between the body of the turbojet 14 and the wing 32 of the aircraft. This longitudinal vertical plane corresponds to the section plane of the drawing of FIG. 1.

The pylon 34 is made of a rigid material such as titanium. At its upstream end portion, it includes suspension means 36, 38 for suspending the turbojet 14 and via which all of the forces transmitted between the engine and the aircraft pass, the downstream end portion of the pylon being connected to the wing 32 of the aircraft by fastener means 40, 42.

As described above, increasing the bypass ratio of the turbojet, i.e. the ratio of the flow rate of the secondary stream 24 to the flow rate of the primary stream 22, leads to the diameters of the fan casing 18 and of the nacelle 12 being enlarged. In order to ensure that the aircraft retains sufficient ground clearance 44, the engine of the turbojet is moved closer to the wing 32, thereby reducing the amount of space 46 situated between the engine and the wing, and likewise increasing the fraction of said space that is allocated to the pylon 34 for attaching the engine.

In the example shown, the upstream end portion of the pylon 34 extends into the passage for the secondary stream 24, and it is fastened to the turbojet 14 via upstream suspension means 36 that extend between the pylon 34 and the hub of the intermediate casing 19, and via downstream suspension means 38 that extend between the pylon and the exhaust casing 30.

The upstream end portion of the pylon 34 that passes through the passage for the secondary stream 24 must be faired in order to avoid excessively interfering with the flow of the secondary stream. Nevertheless, the pylon 34 generates large amounts of turbulence and head loss in this stream, thereby reducing the performance of the turbojet. Furthermore, the air that penetrates into the narrow space 46 situated between the turbojet 14 and the wing 32 of the aircraft needs to flow around the pylon 34, thereby creating a large amount of drag under the wing 32 of the aircraft.

The invention enables these problems of the prior art to be solved, at least in part, by means of a pylon that is angularly offset relative to the longitudinal vertical plane about the axis 35 of the turbojet, and that is situated outside the flow passage for the secondary stream so as to avoid disturbing said flow, thereby increasing the performance of the turbojet and reducing the level of noise it emits in operation.

In the example shown in FIGS. 2 to 8, elements described above with reference to FIG. 1 are designated by the same reference numbers plus one hundred.

The pylon 134 is offset about the axis 135 through an angle α lying in the range 30° to 60°, and equal to about 45°, for example, away from the longitudinal vertical plane 150 and from the top of the nacelle, this angle being measured in a plane perpendicular to the axis 135. The pylon is fastened by suitable means 140, 142 under the wing 132 of the aircraft, and it is located towards the fuselage 152 of the aircraft.

The pylon 134 is located outside the inner wall 126 of the nacelle 112, or indeed outside the nacelle 112, and it is not exposed to the air of the secondary stream 124. It can therefore be made of a material that presents less thermal resistance but that is lighter in weight than the material used for prior art pylons. By way of example, the pylon 134 is made of composite material.

The pylon has upstream and downstream transverse beams 154 and 156 to which the turbojet 114 is attached by respective upstream and downstream suspension means.

The upstream and downstream beams 154 and 156 are substantially parallel and they extend in a substantially horizontal plane away from a side portion of the pylon 134 remote from the fuselage 152 of the aircraft towards their free ends that are situated in the longitudinal vertical plane 150.

The free end of the upstream beam 154 is hinged to one end of a first link 158 having its other end is hinged to the pin of a fork 160 carried by the top of the outer circularly-cylindrical wall of the intermediate casing 119 of the engine. The beam 154 is also hinged via its middle portion to the end of a second link 162 having its other end hinged on the pin of a fork 164 carried by the outer wall of the intermediate casing 119. An intermediate portion of the beam 154 situated between its middle portion and the pylon 134 is connected by a third link 163 to a fork 164 carried by the outer wall of the intermediate casing 119.

In the example shown, the links 158, 162, and 163 are short in length and they lie in a common transverse plane, while being oriented in mutually different directions. The links 158, 162, and 163 are preferably hinged both to the beam 154 and to the forks 160, 164 via ball-and-socket connections.

The pylon 134 is connected by the upstream beam 154 to the outer wall of the intermediate casing 119 of the engine while the prior art pylon 34 is connected to the hub of the intermediate casing.

A rectangular frame of reference OXYZ is defined in which the longitudinal axis OX is parallel to the longitudinal axis 135 of the engine and points downstream, the vertical axis OY points vertically upwards, and the lateral axis OZ points horizontally towards one of the sides of the engine (e.g. towards the fuselage of the aircraft), the axes OX, OY, and OZ being mutually perpendicular.

The beam 154, the links 158, 162, and 163, and their hinge means are designed to take up forces in the lateral and vertical directions OZ and OY, and to take up torque about the axis of the engine.

The free end of the downstream beam 156 is hinged to a connection part 166 that is connected to the ends of two links 168 and 168' in a V-configuration. The connection part 166 is generally triangular in shape, the downstream beam 156 being preferably connected by means of a ball-and-socket connection to the connection part via a first vertex thereof. One of the two links 168 is connected at one of its ends via a pivot connection or the like to a second vertex of the connection part 166, and the other link 168' is rigidly connected at one of its ends to the third vertex of the connection part 166.

The other ends of the links 168 and 168' have respective lugs 170 hinged to the pins of respective forks 172 carried by the exhaust casing 130 of the engine. The connections between the beam 156 and the connection part 166, and between the links 168 and the exhaust casing 130 are ball-and-socket connections.

The links 168, 168' lie in a common transverse plane and they are inclined relative to each other so as to form an upside-down V-shape.

These links 168 and 168' pass through the flow passage of the secondary stream 124 and they are given a streamlined profile in order to limit turbulence and head losses in this stream. In the example shown, the downstream portions 174 of the links 168 and 168' are ridge-shaped with their edges pointing downstream.

The beam 156, the connection part 166, the links 168 and 168', and their hinge or connection means are designed to take up forces in the lateral and vertical directions OZ and OY.

Figure 2:
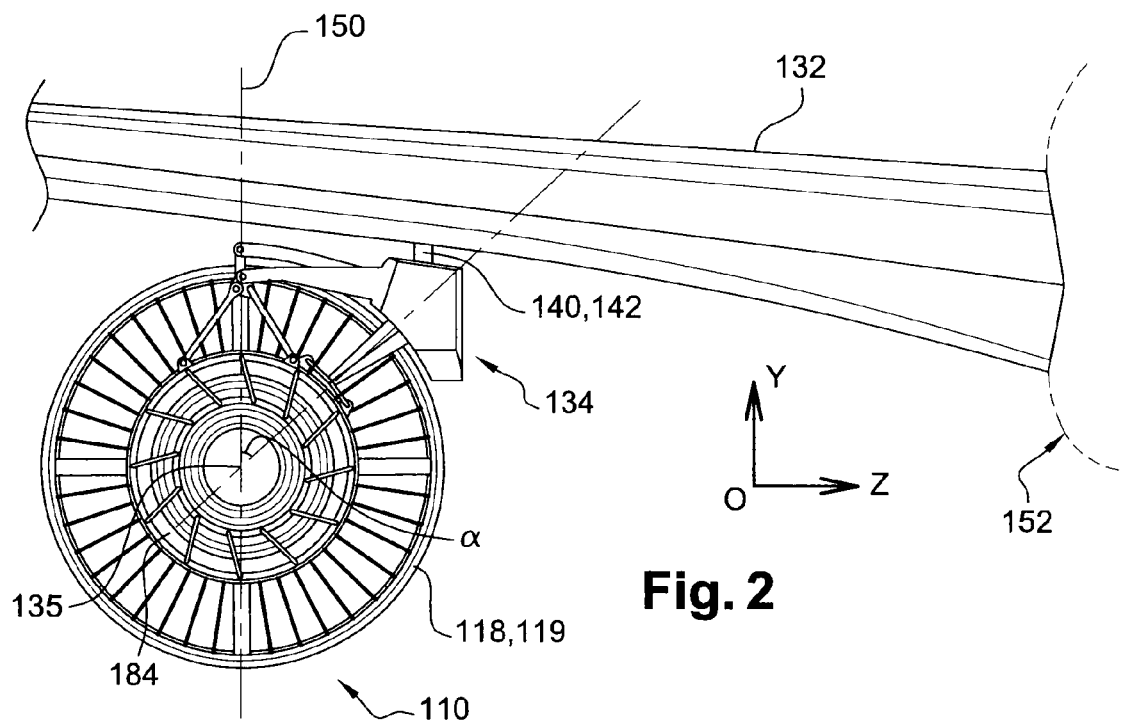
FIG. 2 is a diagrammatic rear view of an aircraft propulsion system of the invention.
Figure 3:
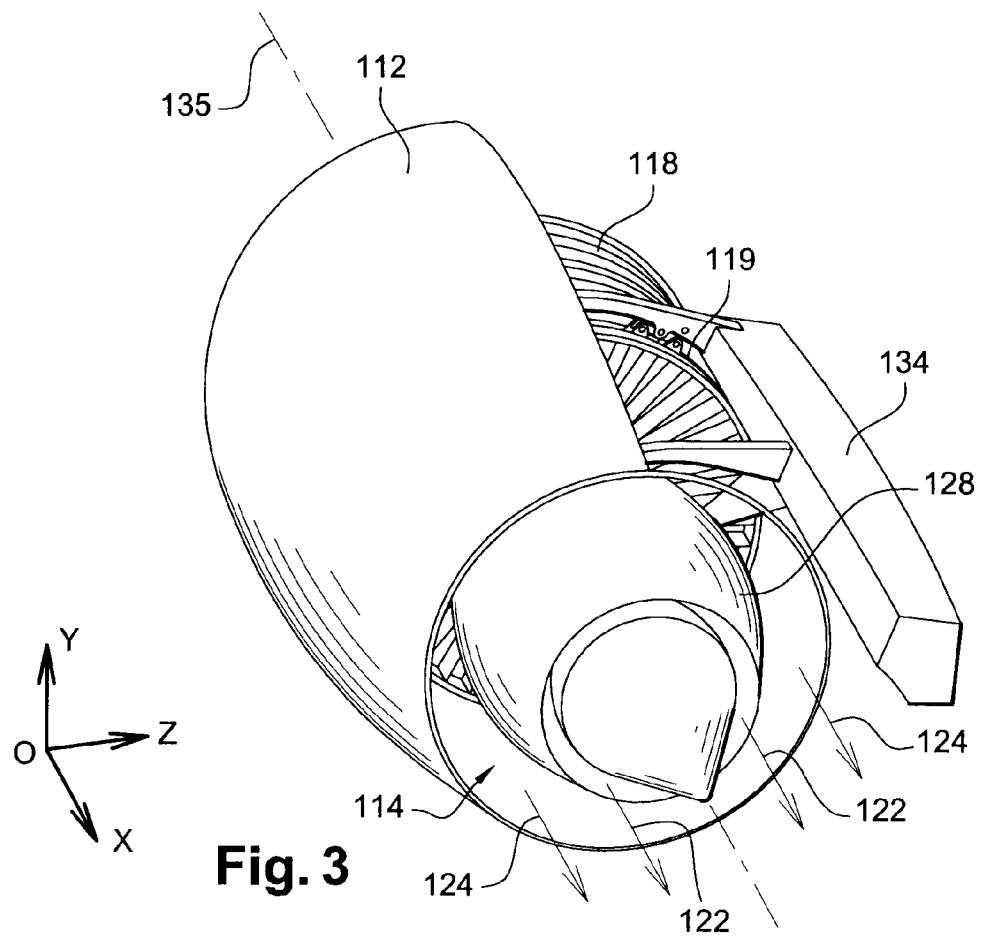
FIG. 3 is a diagrammatic perspective view of the FIG. 2 propulsion system, with the nacelle partially cut away, the system being seen from downstream and from one side.
Figure 4:
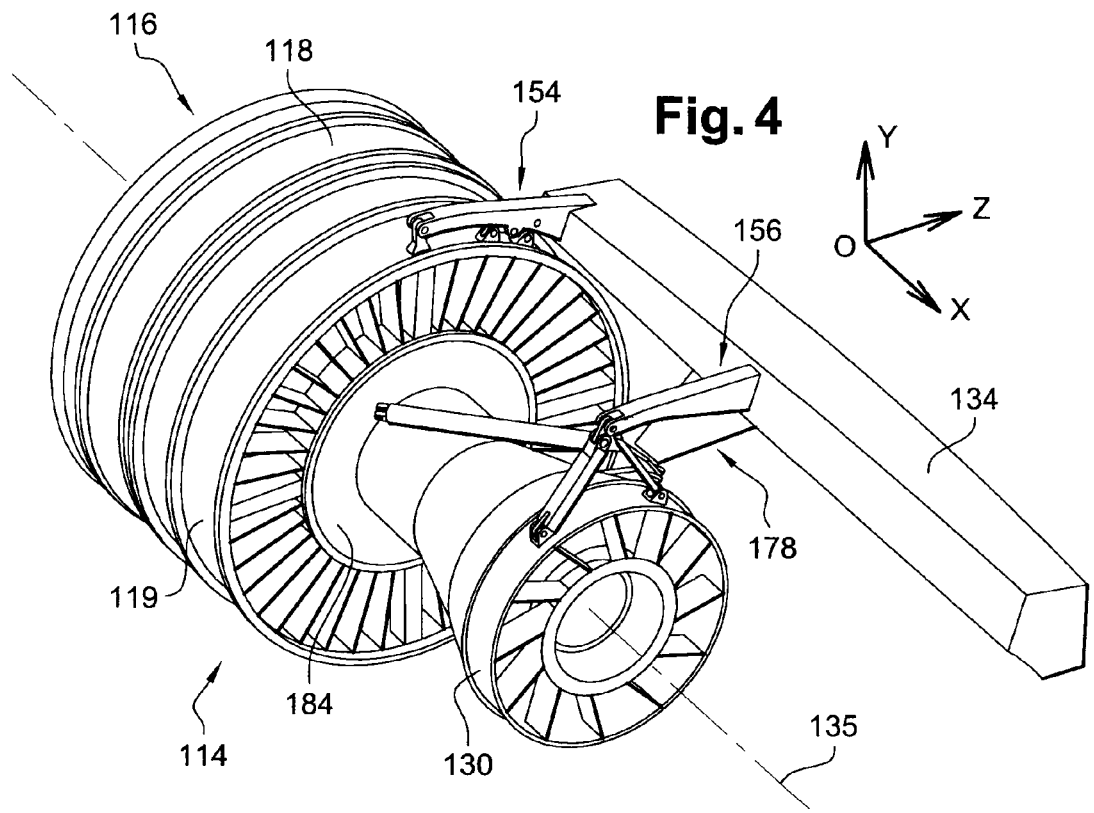
FIG. 4 is another diagrammatic perspective view of the FIG. 2 propulsion system, with the nacelle completely cut away, the system being seen from downstream and from one side.
Figure 5:
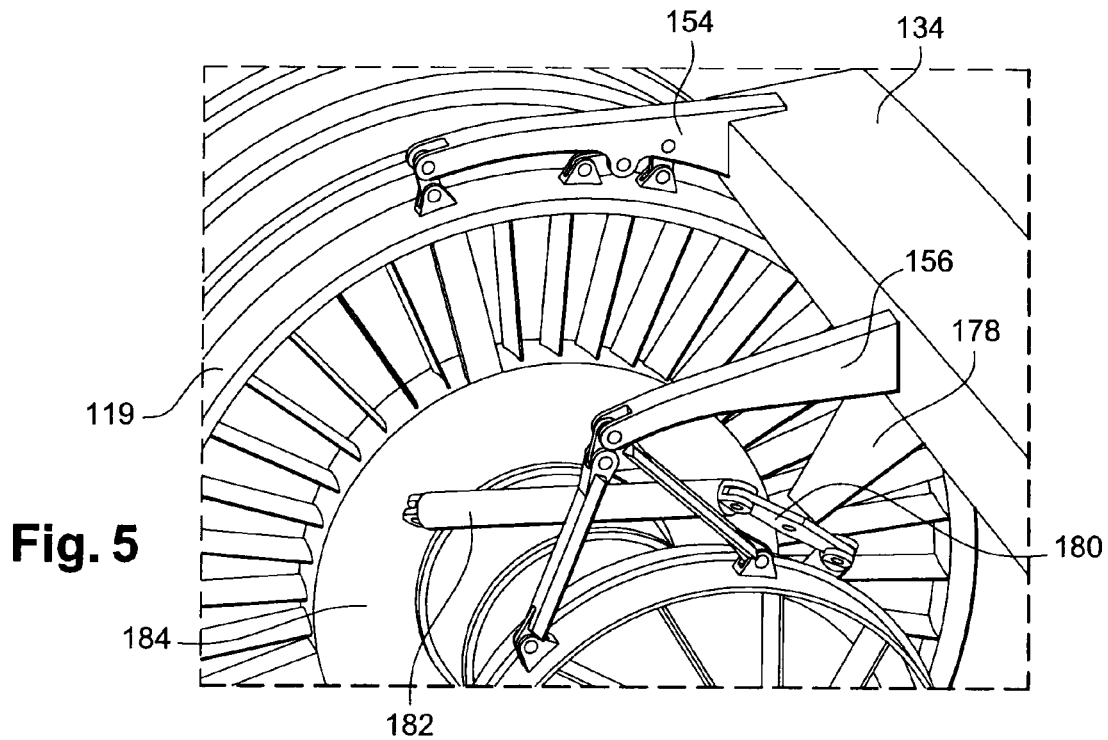
FIG. 5 is an enlarged view showing a portion of FIG. 4.
Figure 6:
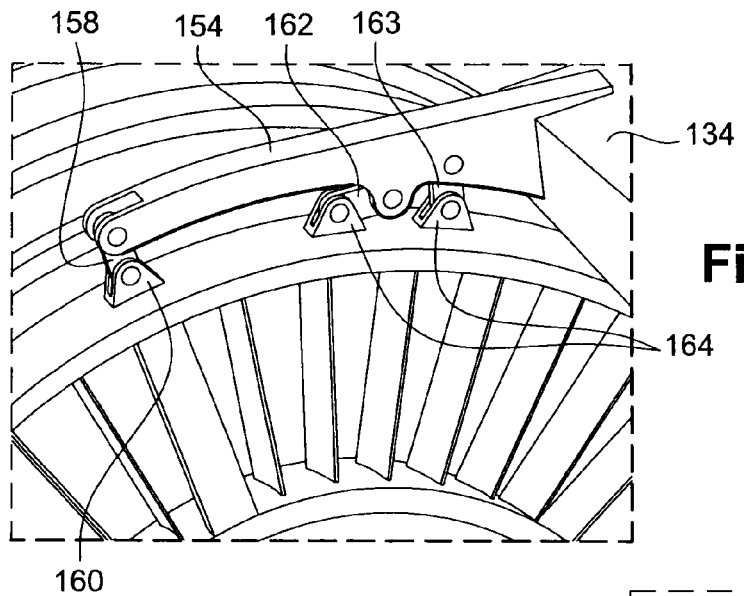
FIG. 6 is a diagrammatic perspective view of the upstream suspension means for the engine of the FIG. 2 propulsion system, seen from downstream and from one side.
Figure 7:
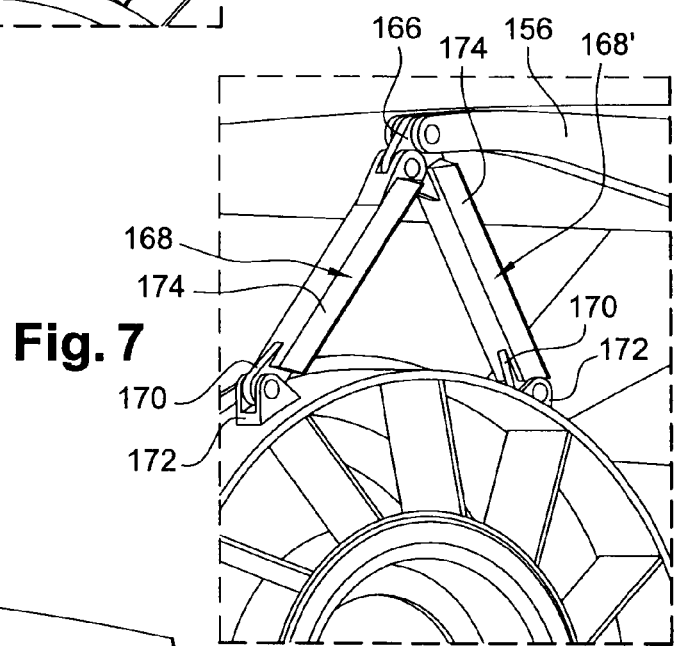
FIG. 7 is a diagrammatic perspective view of the downstream suspension means of the engine of the FIG. 2 propulsion system, seen from downstream and from one side.
Figure 8:
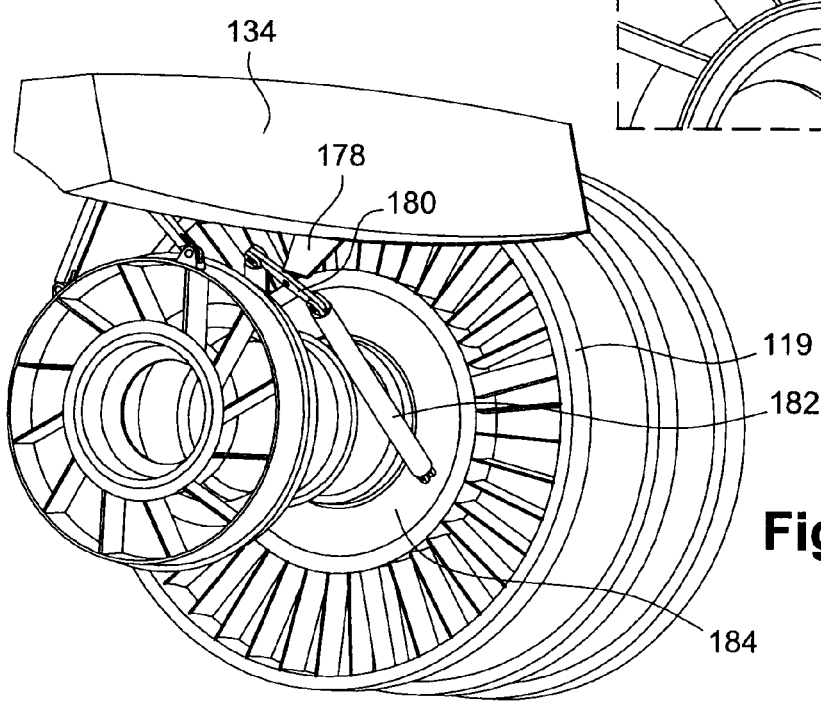
FIG. 8 is a diagrammatic perspective view of the means for taking up the thrust from the engine of the FIG. 2 propulsion system, seen from downstream and from one side.

As can be seen from the above, the free ends of the upstream and downstream beams 154 and 156 are situated in the longitudinal vertical plane 150 (FIG. 2). The links 158 connecting the free end of the upstream beam 154 to the fork 160 of the intermediate casing 119 extend in this vertical plane 150. The links 168 and 168' connecting the exhaust casing 130 to the downstream beam 156 are symmetrical to each other about the vertical plane 150, and their fastening points (forks 172) on the exhaust casing are likewise symmetrical about this plane. The center of gravity of the engine is situated in the longitudinal vertical plane 150. Thus, while the turbojet 114 is being removed and/or put into place, the titling of the engine to one side or the other is very limited and there is therefore little risk of injuring the operators performing the maintenance operation, or of damaging components of the propulsion system.

The pylon 134 also comprises a rigid arm 178 for supporting engine thrust take-up means. The support arm 178 extends transversely and substantially radially relative to the axis of the engine from a middle portion of the pylon 134 towards the body of the turbojet 114, slightly upstream from the exhaust casing 130.

The arm 178 is hinged at its free end to the middle portion of a crossbar 180 having each of its ends hinged to one end of a respective link 182. The links 182 extend upstream and their other ends are hinged via appropriate means to the hub 184 of the intermediate casing 119.

The links 182 and the connection points of these links on the hub of the intermediate casing 119 are symmetrical about a plane containing the longitudinal axis 135 of the engine and the pylon 134. These connection points are spaced apart from each other about the longitudinal axis 135 of the engine by an angle lying in the range 90° to 180°, approximately, this angle being measured in a plane perpendicular to the axis 135.

The support arm 178 forms part of a duct (not shown) for passing services such as electric cables and fluid-conveying pipes (for conveying oil, fuel, etc.), this duct passing through the passage for the secondary stream and being faired with a streamlined profile to limit turbulence in said stream. The crossbar 180 and the links 182 are disposed radially inside the cylindrical envelope surrounding the body of the engine (referenced 28 in FIG. 1) and they are therefore not exposed to the secondary stream.

The invention claimed is:

1. An aircraft propulsion system comprising:
 a bypass turbojet engine surrounded by a nacelle defining a passage in which a secondary stream flows, and
 a connection device that connects the engine under a structural element of an aircraft, the connection device comprising a pylon situated radially outside the flow passage for the secondary stream and lying in a plane substantially parallel to a longitudinal axis of the engine, and
 a suspension device that suspends the engine from the pylon, the plane of the pylon being angularly offset from a vertical plane containing the longitudinal axis of the engine, wherein
 the suspension device that suspends the engine from the pylon comprises two parallel and substantially horizontal transverse beams that connect the pylon to hinges on top portions of casings of the engine, and wherein
 the pylon further comprises an additional arm supporting an engine thrust take-up device, the additional arm extending from the pylon towards the engine and being connected at its free end to a crossbar having ends connected to an intermediate casing via links.

2. A propulsion system according to claim 1, wherein the pylon is offset about the longitudinal axis of the engine by an angle lying in the range 30° to 60°, approximately, away from the vertical plane and from the top of the nacelle.

3. A propulsion system according to claim 1, wherein the pylon carries an upstream transverse beam that is connected by a first hinge to a top portion of the intermediate casing of the engine, and a downstream transverse beam that is connected by a second hinge to a top portion of an exhaust casing of the engine.

4. A propulsion system according to claim 3, wherein the first hinge of the upstream transverse beam connected to the top portion of the intermediate casing comprise three links, a first link connected to the free end of the beam, a second link connected to an intermediate portion of the beam, and a third link connected to the beam between its intermediate portion and the pylon.

5. A propulsion system according to claim 3, wherein the downstream transverse beam is connected at its free end to two links in a V-shaped configuration that are hinged to the top portion of the exhaust casing.

6. A propulsion system according to claim 5, wherein the two links in the V-shaped configuration pass through the passage for passing the secondary stream and are faired, at least in part.

7. A propulsion system according to claim 4, wherein at least some of the three links are hinged to the upstream transverse beam and to the intermediate casing via ball-and-socket connections.

8. A propulsion system according to claim 1, wherein the additional arm is an oblique rigid arm.

9. A propulsion system according to claim 8, wherein the oblique rigid arm extends substantially radially relative to the longitudinal axis of the engine.

10. A propulsion system according to claim 8, wherein connection points between the links and the intermediate casing are spaced apart from each other about the longitudinal axis of the engine by an angle lying in the range 90° to 180°, approximately.

11. A propulsion system according to claim 10, wherein the connection points of the links are symmetrical to each other relative to an oblique plane containing the longitudinal axis of the engine and the pylon.

12. A propulsion system according to claim 8, wherein the oblique rigid arm forms a portion of a streamlined duct for passing services such as fluid-conveying pipes and electric cables.

13. A propulsion system according to claim 1, wherein the ends of the crossbar are connected to the intermediate casing via two links.

14. An aircraft propulsion system comprising:
a bypass turbojet engine surrounded by a nacelle defining a passage in which a secondary stream flows, and
connection means for connecting the engine under a structural element of an aircraft, the connection means comprising a pylon situated radially outside the flow passage for the secondary stream and lying in a plane substantially parallel to a longitudinal axis of the engine, and
means for suspending the engine from the pylon, the plane of the pylon being angularly offset from a vertical plane containing the longitudinal axis of the engine, wherein
the means for suspending the engine from the pylon comprise two parallel and substantially horizontal transverse beams that connect the pylon to hinge means on top portions of casings of the engine, and wherein
the pylon comprises an oblique rigid arm supporting engine thrust take-up means, the arm extending from the pylon towards the engine and being connected at its free end to a crossbar having ends connected to the intermediate casing via links.

15. A propulsion system according to claim 14, wherein the ends of the crossbar are connected to the intermediate casing via two links.

* * * * *